Figure 1:
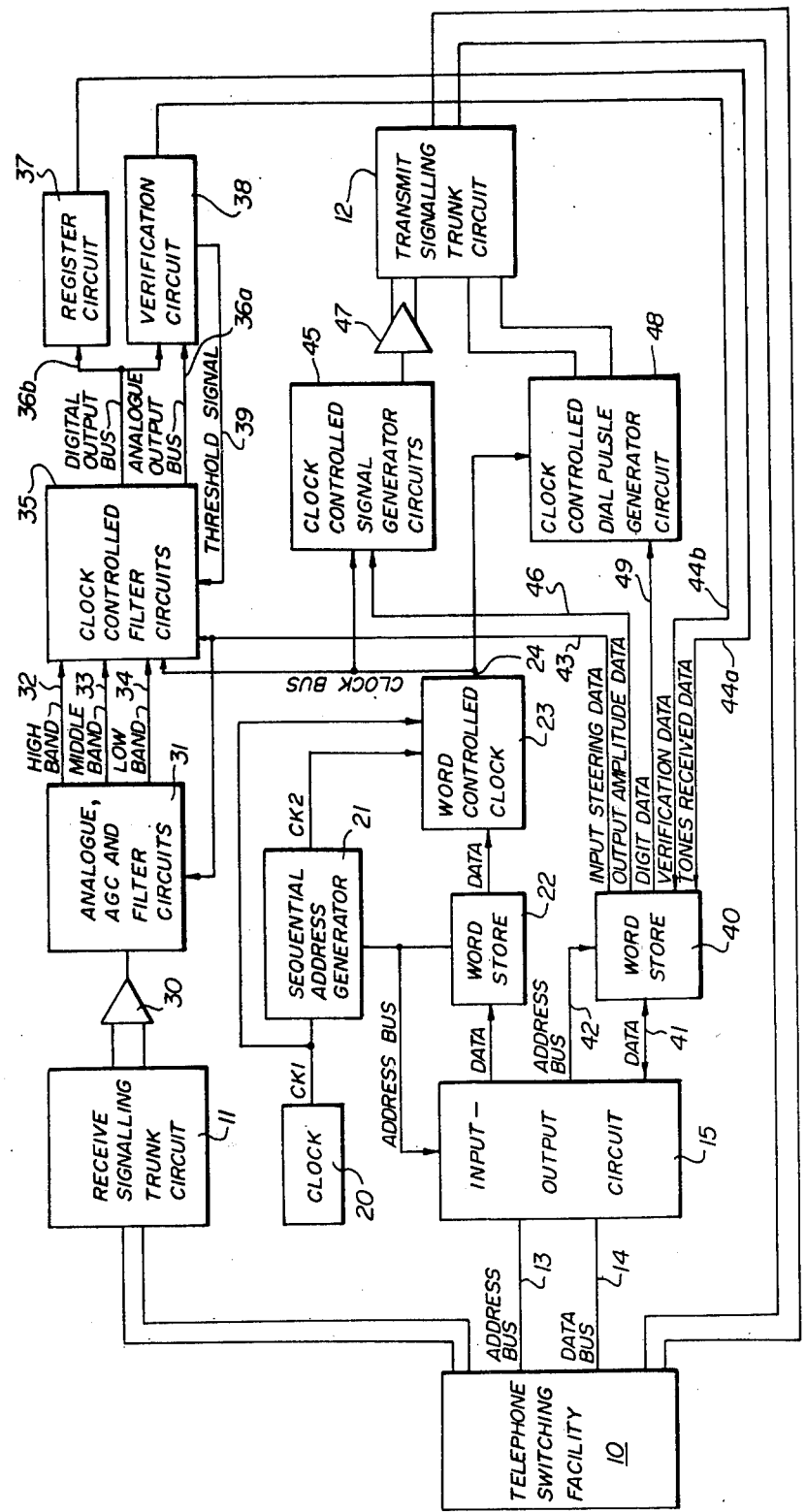

United States Patent [19]

Munter

[11] 4,124,898
[45] Nov. 7, 1978

[54] PROGRAMMABLE CLOCK

[75] Inventor: Ernst A. Munter, Ottawa, Canada

[73] Assignee: Northern Telecom Limited, Quebec, Canada

[21] Appl. No.: 805,314

[22] Filed: Jun. 10, 1977

Related U.S. Application Data

[62] Division of Ser. No. 717,618, Aug. 25, 1976, Pat. No. 4,076,965.

[51] Int. Cl.² ............................................. G06F 15/20
[52] U.S. Cl. ..................................... 364/703; 307/269; 307/271; 328/39; 328/140
[58] Field of Search .................. 364/701, 703; 328/37, 328/38, 39, 72, 74, 140; 307/269, 271, 208, 231, 225; 235/92 FQ

[56] References Cited

U.S. PATENT DOCUMENTS

| 3,716,794 | 2/1973 | Teggatz et al. | 328/39 |
| 3,824,385 | 7/1974 | Kiencke | 364/703 |
| 3,826,901 | 7/1974 | Band et al. | 364/703 |

Primary Examiner—Joseph F. Ruggiero
Attorney, Agent, or Firm—Frank Turpin

[57] ABSTRACT

A clock signal generator is responsive to a signal having a pulse repetition rate, and to a word instruction to generate a new signal having a pulse repetition rate according to the word instruction. The clock signal generator in one embodiment is capable of providing a plurality of clock signals each according to an associated word instruction.

1 Claim, 2 Drawing Figures

PROGRAMMABLE CLOCK

This specification has been divided from a patent application by Rolf E. Olsen et al with Ser. No. 717,618 and filed on August 25, 1976, now Pat. No. 4,076,965.

The present invention relates to the generation of clock signals of the type typically utilized for timing functions in digital processing machines and some related peripheral devices. A clock signal generator is responsive to a master clock signal and a word instruction to generate a pulse signal having a repetition rate according to the word instruction.

In the design and construction of a telephone signalling receiver/sender similar to that disclosed in the above-mentioned application, it was realized that many of the functions required by the receiver/sender could be economically realized if a substantially accurate source of variable clock signals could be found.

The present invention is a clock circuit which meets the requirement of the receiver/sender and accrues further economies in that it is well suited for construction utilizing the well known digital electronic hardware technologies. The clock circuit includes a bit circulator having bit registers. Each bit register has stages corresponding in number to the number of generated clock signals and each bit register is responsive to a master clock signal to shift bits therethrough. An adder includes inputs and outputs connected to the first and last stages of each of the bit registers respectively. The adder also includes inputs for receiving the bits of an instruction word. The bits from the instruction word are added in the adder to the bits from the last stage of each bit register and the sum is applied to the first stage of the bit registers.

In the case where a plurality of clock signals is needed a sampling and storing means stores the bit in each stage of the most significant bit register at a time defined by the master clock signal frequency divided by the number of clock signals, whereby the pulse repetition frequency at each output of the sampling means and storing means is defined by the master clock signal and the associated instruction word.

In a simple form the clock circuit generates one frequency which corresponds to the master clock frequency times the value of an instruction word divided by a number n. The clock includes an adder having n first inputs for receiving the instruction word, n second inputs and n outputs. A bit circulator including n portions is connected between the n second inputs and the n outputs and is responsive to the master clock signal to circulate bits from the n outputs to the respective n inputs with a delay of the period of the pulse repetition frequency of the master clock signal. The output signal of the most significant of the n portions of the bit circulator is the generated clock signal.

Figure 2:
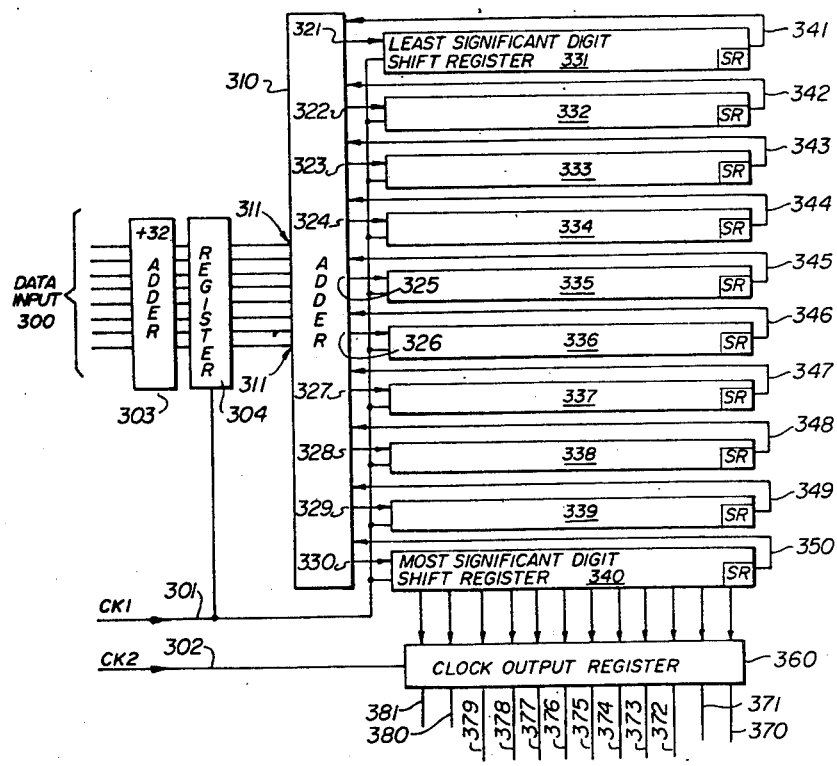

An example embodiment of the invention will now be described with reference to the accompanying drawings in which:

FIG. 1 is a block schematic diagram of a receiver sender apparatus connected with a telephone switching facility; and FIG. 2 is a schematic block diagram of a word controlled clock used in FIG. 1.

Referring to FIG. 1, the receiver sender apparatus is connected to a telephone switching facility 10 via receive and transmit signalling trunk circuits 11 and 12, and by address and data buses 13 and 14. A clock circuit 20 supplies clock pulses CK1 to a sequential address generator 21 which generates repetitive sequences of 12 address words. The address words are supplied to a word store 22 and to an input output circuit 15. Data from the data bus 14 is written into the word store 22 by the input output circuit when the address on the address bus 13 coincides with the address from the sequential address generator 21. The sequential address generator 21 also generates a clock pulse CK2 with each completion of a twelve word sequence of addresses. The clock pulse CK2 thus occurs at one twelfth the rate of the clock pulses CK1. These clock pulses are fed to a word controlled clock 23 along with 12 data words per clock pulse from the word store 22. The word controlled clock 23 outputs 12 clock signals onto the leads in a clock signal bus 24. The frequency of each of the clock signals is determined by the frequency of the clock pulses CK1 and by the value of its corresponding data word from the word store 22. The frequency of the generated clock signal is defined by the frequency of CK1 multiplied by the corresponding data word and divided by a fixed factor.

The telephone switching facility 10 determines connections between the telephone network and the signalling trunk circuits 11 and 12. Signals from the receive signalling trunk circuit 11 are received in balanced configuration by an amplifier 30 and transmitted therefrom in unbalanced configuration to an analogue AGC amplifier and associated filter circuits 31. The circuits 31 are connected to clock controlled filter circuits 35 via a high band lead 32, a middle band lead 33 and a low band lead 34. The analogue AGC amplifier operates on signals having a wide range of amplitudes to bring these amplitudes into a narrow range. The filter circuits are switch controlled to select one or more frequency pass bands for transmission of signals from the AGC amplifier to the filter circuit 35. The filter circuits 35 include a plurality of pass band circuits each of which is adjustable as to its center frequency by a clock signal on the clock bus 24.

A word store 40 is connected to the input-output circuit 15 via a 2-way data bus 41 and an address bus 42. Receive signal input steering data is transferred from the word store 40, via leads 43, to the analogue AGC amplifier and filter circuits 31 and to the clock controlled filter circuits 35 to define bands passed by the filter circuits 31 and the input configuration of the controlled filter circuits 35. Each of the filter circuits 35 compares the amplitude of a signal in its pass band with a threshold level to provide a binary output on a digital output bus 36b. The digital output bus is connected to a register circuit 37 and to a verification circuit 38. An analogue output lead 36a and a threshold signal lead 39 are connected between the filter circuits 35 and the verification circuit 38. The verification circuit 38 checks to determine if sufficient signal is passed by any of the filters in the controlled filter circuits 35 and to determine if signals on the digital output bus 36b persist for required periods of time and in proper combination to represent valid signalling. This circuit also generates the threshold signal on the lead 39 for use by the filter circuit 35. The outputs of the register circuit 37 and of the verification circuit 38 are carried to the word store 40 via a tone received data bus 44a and a verification data bus 44b respectively. The information on these buses is held in the word store 40 for access by the telephone switching facility 10 via the input output circuit 15. Hence signalling received by the receive signalling trunk circuit 11 is registered digitally in the register 37 and the word store 40, with an indication as to the validity of the received signalling also being registered in the word store 40.

Signalling transmitted by the receiver sender is also controlled by word instruction via the word controlled clock 23. Clock controlled signal generator circuits 45 are each connected to an individual lead in the clock bus 24, and each are also connected to a word location in the word store 40 via leads in an output amplitude data bus 46. Each of the clock controlled signal generator circuits 45 generates a sine wave function having a frequency related to the clock pulse repetition frequency of the clock signals on the associated lead in the clock bus 24, and having an amplitude substantially as defined by an amplitude word in the word store 40 conveyed by the bus 46. Output signals, i.e. the sine wave functions, are added together and applied to the input of an amplifier 47 which amplifies the output signals and applies these signals, in balanced configuration, to the transmit signalling trunk circuit 12.

Outpulsing is likewise controlled by the clock pulse repetition frequency on one of the leads in the clock bus 24, which is connected to a clock controlled dial pulse (DP) generator circuit 48. This provides for dial pulse sending rates which are adjustable and very accurate. The digit for transmission is stored at a word location in the word store 40 which is connected to the DP generator circuit 48 via a digit data bus 49. The mark space ratio of dial pulses can be fixed internally in the DP generator or can be defined by an additional word from the word store 40. Various digital circuit designs are available which can be utilized to provide the dial pulse generator 48. One example is described in the Canadian Pat. No. 926,049 entitled "Dial Pulse and Multiple Frequency Signalling Receiver Apparatus" issued to A. E. Dodson on May 8, 1973. Since that time, various large scale integrated circuits have become commercially available which are economically attractive and which are ideally suited to the implementation of this function however yet based on the principles of dial pulse generation substantially as taught by A. E. Dodson. The output of the clock controlled DP generator circuit 48 is connected to the transmit signalling trunk circuit 12.

The example embodiment thus far described in reference to FIG. 1 has illustrated one form of system architecture and operation for meeting the requirements of a receiver sender apparatus adaptable, through the use of word instruction, to a plurality of signalling systems. A more detailed discussion of the clock circuit in the example embodiment follows, with reference to FIG. 2.

Referring to FIG. 2, a word controlled clock is shown having a data input 300 for receiving eight bit words, a clock input lead 301 for receiving clock signals (CK1) and a clock input lead 302 for receiving clock signals (CK2) at a fraction of the rate of the clock signals (CK1). In this embodiment, the rate of clock signals (CK2) is one twelfth the rate of clock signals (CK1). The clock signals (CK1) and the clock signals (CK2) are received from the clock 20 in FIG. 1 and from the sequential address generator 21 in FIG. 1. The eight bit words are received from the output of word store 22, with a new word being received at the data input 300 in synchronism with each clock signal (CK1). The data input 300 is connected to the input of an adder 303. A nine bit output of the adder 303 is connected to the data input of a register 304 which also has an input connected to the clock input lead 301. The output of the register 304 is connected to an adder 310 via a data input 311 of the adder 310. Ten data output leads 321-330 are connected between 10 outputs of the adder 310 and the inputs of 10 shift registers 331-340 respectively, and each 12 stages in length. The shift register 331 is labelled as the least significant digit shift register, and the shift register 340 is labelled as the most significant digit shift register. Each shift register 331-340 includes a shift input connected to the clock input lead 301. The output of the last stage of each of the shift registers 331-340 is connected to one of 10 more inputs of the adder via leads 341-350. A clock output register 360 includes 12 inputs connected to outputs of the 12 stages of the most significant digit shift register 340. The clock output register 360 also includes an input or receiving clock signals (CK2) and is connected to the clock input lead 302.

In operation the lowest frequency clock signal which can be generated is determined by the adder 303 which always adds a constant (+32) to each instruction word. The register 304 loads the instruction word +32 with each occurrence of a clock pulse on the lead 301. The shift register 331-340 are caused to shift by the clock signal on the lead 301 and so are synchronized with the loading of the register 304. The output of the last stage of each of the shift registers 331-340 is conducted via leads 341-350 respectively to the adder 310. The output of the register 304 and the bits on the leads 341-350 are added together with the sum word being presented to the first stages of the shift register 331-340 via the adder outputs 321-330 respectively. The most significant bit of each sum word is loaded into the clock output register with each occurrence of a clock pulse (CK2) on the lead 302. Each sum word increases in value toward a maximum beyond which it returns toward zero and increases again. Each sum word is monitored by the clock output register 360 at the instant in which each sum word is at a consistent predetermined location in the shift register 331-340. This has the effect of producing a 50% duty cycle clock signal at each of the twelve outputs of the clock output register. These output clock signals appear on leads 370-381 respectively and are henceforth referred to as clocks 0-11 respectively. These clocks 0-11 each have a repetition frequency which is proportional to the value of the instruction words from corresponding word locations in the word store 22 in FIG. 1.

Detailed Clock Operation

A more detailed explanation of the operating theory of the word controlled clock in FIG. 2 follows, however understanding of the detailed theory of operation is not necessary for the construction of the example embodiment. A detailed understanding of the operation of the word controlled clock is helpful if one wishes to derive the particular word instructions required to operate the receiver sender in any given signalling format. The detailed explanation is simplified by considering the operation of only one clock and does not take into account the time shared aspect of the hardware of FIG. 2 as it is utilized to generate multiple clocks. Hence the length of each shift register 331-340 is only one stage instead of 12 stages and the pulse repetition frequency of CK1 is equal to that of CK2.

The shift registers 331-340 at any time store the numerical value $Q_x$. The registers are continuously clocked by the clock signal with the frequency fm, and the contents of the registers change with every clock pulse so that $$Q_{(x+1)} = (Q_x + P + K) \text{ modulo } 2^N \quad (1)$$

(in this embodiment N = 10) where P is a programmable value and K is a fixed value, and where $$P + K < 2^{N-1} \quad (2)$$

Combining (1) and (2), the value of Q follows $$Q_{x+1} = Q_x + P + K \text{ if } (Q_x + P + K) < 2^N \quad (3a)$$

$$Q_{x+1} = Q_x + P + K - 2^N \text{ if } (Q_x + P + K) > 2^N \quad (3b)$$

The most significant bit of Q is defined "high" for $Q > 2^{N-1}$ and "low" for $Q < 2^{N-1}$. Because of (2), it takes at least two and at most $2^N/(P+K)$ clockpulses for Q to transverse its range, corresponding to a "low" - "high" cycle of the most significant bit (MSB) of Q. The "high" - "low" transition of the MSB is characterized by (3b).

After n clockpulses $$Q_{x+n} = [Q_x + (P+K) * n] \text{ modulo } 2^N \quad (4)$$

$$\text{or } Q_{x+n} = Q_x + n * (P+K) - m * 2^N \quad (4b)$$

where m = integer $$\left[ \frac{Q_x + n * (P + K)}{2^N} \right]$$

For $n = 2^N$ this becomes m = integer $$\left[ \frac{Q_x}{2^N} + P + K \right]$$

$$= P+K$$

because $Q_x/2^N < 1$ by definition; Thus $Q_{x+2^N} = Q_x$

This means that the cycle repeats exactly after every $2^N$ clockpulses, and during each cycle the number of "high" - "low" transitions of the MSB is equal to P+K. The programmed frequency is thus $$fp = fm * P+K/2^N \quad (6)$$

The number (t) of clockpulses between any two "high" - "low" transitions of the MSB is derived below:
Any $Q_x$ is chosen so that $$Q_x + P+K > 2^N \quad (6b)$$

then $Q_{x+1} = Q_x + P+K - 2^N \quad (5)$ from this follows that $$0 < Q_{x+1} < P+K \quad (7)$$

After t clockpulses and A "high" - "low" transitions:

$$Q_{x+1+t} = Q_{x+1} + t(P+K) - 2^N * A \quad (8)$$

where $$0 < Q_{x+1+t} < P+K \quad (9)$$

From (7, 8, 9):

$$t = A * \frac{2^N}{P+K} + \frac{Q_{x+t+1} - Q_{x+1}}{P+K} \quad (10)$$

$$= A * \frac{2^N}{P+K} \pm E$$

where $E < 1$

The component $2^N/P+K = fm/fp$ is the average period of the programmed frequency output fp expressed as a fractional number of clockpulses CK1; E is the rounding error to make t an integer number. The time period between any two (not only between consecutive) transitions deviates from the average by less than one clock period of the clock CK1. This has the effect that even after further simple division of fp by R to obtain fx, the phase jitter of fx is less than one clock period of fm.

What is claimed is:
1. A clock circuit for generating a plurality of clock signals corresponding to a plurality of associated instruction words and a master clock signal having a predetermined pulse repetition frequency, the clock circuit comprising:
adder means having first inputs for sequentially receiving the plurality of associated instruction words, n second inputs and n outputs;
n shift registers, each connected between one of the n outputs and an associated one of the n second inputs, each shift register having a plurality of stages and each shift register being responsive to the master clock signal to shift bits therethrough, one of the shift registers being connected between the most significant output and the most significant second input of the adder means, said shift register being the most significant shift register;
an output register having inputs connected to each of the stages of the most significant shift register, the output register being responsive to a second clock signal occurring at a rate of the pulse repetition frequency of the master clock signal divided by the number of stages in the most significant shift register;
whereby a plurality of clock signals corresponding to the plurality of associated instruction words is generated.

* * * * *